{United States Patent Office}

3,660,361
Patented May 2, 1972

3,660,361
HIGHLY ORDERED AZO-AROMATIC POLYAMIDES
Hartwig C. Bach, Pensacola, Fla., assignor to Monsanto Company, St. Louis, Mo.
No Drawing. Continuation-in-part of application Ser. No. 789,072, Jan. 2, 1969. This application Sept. 28, 1970, Ser. No. 76,284
The portion of the term of the patent subsequent to Mar. 17, 1987, has been disclaimed
Int. Cl. C08g 20/20, 20/22
U.S. Cl. 260—78 R          12 Claims

ABSTRACT OF THE DISCLOSURE

Linear polyamides derived from aromatic diacid halides and diamines containing azo linkages and asymmetrical aromatic radicals have been found to have thermal, mechanical and electrical properties attractive for use of the polyamides in the manufacture of fibers, films and other shaped articles.

CROSS-REFERENCE TO RELATED APPLICATION

This application is a continuation-in-part of my co-pending application Ser. No. 789,072 which was filed on Jan. 2, 1969, and is now abandoned.

SUMMARY OF THE INVENTION

This invention relates to a class of novel film- or fiber-forming aromatic polyamides consisting essentially of recurring units having the structural formula $$-\overset{O}{\underset{\|}{C}}-Ar'-\overset{O}{\underset{\|}{C}}-\overset{H}{\underset{|}{N}}-Ar-N=N-Ar-\overset{H}{\underset{|}{N}}-$$

wherein Ar represents an asymmetrical divalent aromatic radical, Ar' represents a divalent aromatic radical and $$-\overset{H}{\underset{|}{N}}-Ar-N=N-Ar-\overset{H}{\underset{|}{N}}-$$

has a molecular weight not greater than about 1000, said radicals having no substituents that are reactive with amino groups or acid halide groups. In such polyamides, Ar may be a single-ring divalent aromatic radical or a multi-ring divalent aromatic radical such as a fused-ring radical or a radical containing at least two rings linked by a bond between a ring-atom of each of said rings or by a divalent radical such as $$-O-, -S-, -\overset{O}{\underset{\|}{C}}-, -\overset{O}{\underset{\|}{\underset{\|}{S}}}-, -\overset{O}{\underset{\|}{C}}NH-, -CH=CH-$$

, $-N=N-$, 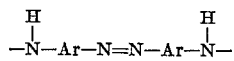, $-\overset{}{\underset{R}{N}}-$, $-\overset{}{\underset{R}{P}}-$ and $-\overset{O}{\underset{R}{\overset{\|}{P}}}-$ in which R is lower ($C_1$–$C_4$) alkyl and $n$ is an integer from 1 to 6. The novel polyamides can be conveniently prepared by conventional polyamidation procedures and are typically formed by reaction of at least one aromatic diacid halide (e.g. chloride) with at least one diamine containing at least one azo linkage and at least two asymmetrical aromatic radicals. Particularly when the diamines empolyed are symmetrical, the resulting polyamides are highly ordered polymers having excellent thermal, mechanical and electrical properties.

DETAILED DESCRIPTION OF THE INVENTION

The diamines employed in the preparation of the polyamides of this invention are represented by the structural formula $$H_2N-Ar-N=N-Ar-NH_2$$

wherein Ar is an asymmetrical divalent radical containing at least one aromatic ring exhibiting resonance in the classic sense, e.g. a ring characterized by the benzenoid unsaturation of benzene, naphthalene or a bridged diphenyl such as diphenyl ether or diphenyl sulfone. When Ar is a single-ring radical, that ring may be carbocyclic or heterocyclic. When Ar is a multi-ring radical, the rings in said radical may be all aromatic or inclusive of at least one ring that is not aromatic and they may be all carbocyclic, all heterocyclic or inclusive of carbocyclic and heterocyclic rings. The rings in such a multi-ring radical may be wholly or partially composed of fused-ring systems which may contain only carbocyclic rings, only heterocyclic rings or carbocyclic and heterocyclic rings or they may be wholly or partially composed of at least two carbocyclic and/or heterocyclic rings linked by a bond between a ring-atom of each of said rings or by a divalent radical such as $$-O-, -S-, -\overset{O}{\underset{\|}{S}}-, -\overset{O}{\underset{\|}{\underset{O}{S}}}-, -\overset{O}{\underset{\|}{C}}-, -CH=CH-,$$ 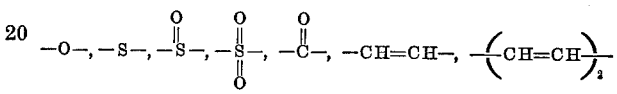

$-N=N-$, 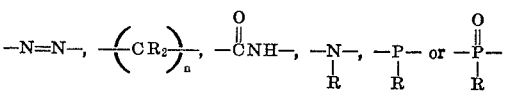, $-\overset{O}{\underset{\|}{C}}NH-$, $-\overset{}{\underset{R}{N}}-$, $-\overset{}{\underset{R}{P}}-$ or $-\overset{O}{\underset{R}{\overset{\|}{P}}}-$ wherein R is lower (e.g. $C_1$–$C_4$) alkyl radical and $n$ is an integer from 1 to 6. The aforementioned heterocyclic rings may contain one or more heteroatoms such as $$-O-, -S-, -N= \text{ or } -\overset{|}{N}-$$

and are exemplified by pyridine, oxadiazole, thiazole, imidazole and pyrimidine rings.

The polyamides of this invention are generally but not exclusively prepared using diamines of such a type that the amide groups formed by polymerization of such diamines and the aforementioned aromatic diacid halide reactants are directly linked to ring atoms of the diamines. The diamines employed are also generally such that the molecular weight of the $$-\overset{|}{N}-Ar-N=N-Ar-\overset{|}{N}-$$

radical in the foregoing structural formula of the polyamide is not greater than about 1000, although diamines having molecular weights of up to about 2000 may be employed in some cases. In the diamines employed, the divalent aromatic radical, Ar typically contains from one to five carbocyclic or heterocyclic rings although diamines containing a larger number of such rings can be used if desired. The rings in such Ar radicals are also generally integral parts of the chain linking the two amino groups of the diamine rather than pendant from said chain.

The diamine reactants can be prepared by oxidative coupling of similar or dissimilar asymmetrical primary diamines wherein the basicity of one amine group is greater than the basicity of the other amine group because of the asymmetry of the diamine. The asymmetry may result from the presence of a ring substituent on a radical such as

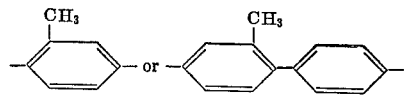

from an asymmetrical arrangement of linkages in a radical such as

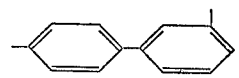

from an asymmetrical ring-linking group in a radical such as

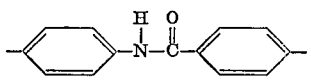

or by combinations of one or more of these factors in a radical such as

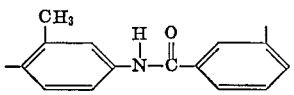

Examples of the various asymmetric diamines that are useful ni the preparation of the diamine monomers of the polyamides of this invention are represented by the following formulae:

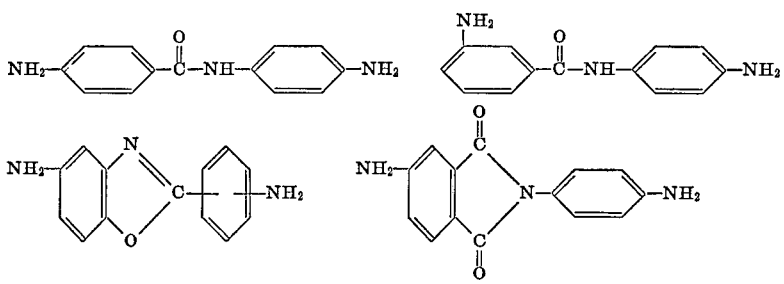

Suitable heterocyclic diamines include those derived from aromatic heterocyclic nuclei such as pyridine, pyrazine, thiazole, oxazoline, benzoxazole, triazole, furan and combinations of this type. Examples of such asymmetric diamines include the following:

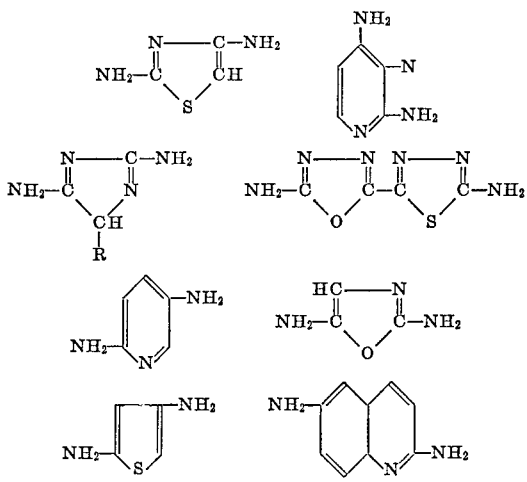

where R represents hydrogen, lower alkyl or aryl.

The symmetrical, aromatic azo diamines employed in the process of this invention can be prepared by the oxidative coupling of asymmetrical aromatic diamines in solution, utilizing a cupric ion complexed with a nitrogen base. Preferably, the oxidative solution dimerization is conducted as a catalytic process with a cupric-cuprous redox couple complexed with a nitrogen base as the catalyst, a nitrogen base as the solvent and molecular oxygen as the primary oxidant.

The active catalyst system is preferably obtained by oxidation of a cuprous salt in the presence of a nitrogen base, although some cupric salts such as cupric acetate may also be used. Any cuprous salt may be used in the practice of this invention provided that it forms a complex with the nitrogen base that is soluble in the reaction medium and that it is capable of existing in the cupric state. The particular salt used has no effect on the type of product obtained. Typical examples of cuprous salts suitable for the process are cuprous chloride, cuprous bromide, cuprous sulfate, cuprouse acetate, cuprous benzoate and the like. The use of cupric salts is generally less desirable in the catalyst preparation although cupric acetate is quite effective.

It is believed that cupric ion, complexed with a nitrogen base, complexes with the amino groups of the starting diamine, then oxidizes them and aids in the coupling of the resulting species. During this reaction cuprous salt or complex is formed which is reoxidized by oxygen (or its precursors such as $H_2O_2$) to the cupric state. Based on this mechanism, chemical oxidants also appear to be useful which can oxidize the cuprous ion to the cupric ion.

Since the reaction does not destroy the catalyst, only a small catalytic amount of cuprous or cupric salt needs to be used, from about 0.1 to 10 mole percent, based on the moles of aromatic diamine to be oxidized, although larger amounts can be used, as desired.

Nitrogen bases which may be used as a component of the catalyst as well as the reaction medium include all nitrogen bases except those which are oxidized by the catalyst. It is preferred to have the basicity of the nitrogen base as close as possible to that of the primary diamine starting material in order to help the reaction proceed at the most optimum rate and give better yields.

Suitable nitrogen bases include various amides such as phosphoramides, carbonamides and sulfonamides. Examples of such amides are hexamethylphosphoramide, dimethylacetamide, dimethylformamide, dimethylpropionamide, diethylacetamide, N-acetylpyrrolidone, N-ethyl pyrrolidone and the like. Of these amide bases, dimethylacetamide and hexamethylphosphoramide are generally preferred.

Other nitrogen bases, suitable for carrying out the process include aliphatic tertiary amines such as triethylamine, tributylamine, diethylmethylamine, and cyclic amines such as pyridine, n-alkyl piperidines, quinolines, isoquinolines, N-alkyl morpholines and the like. Among these, pyridine is preferred.

Mixtures of bases which form a part of the catalyst system may also be used. They may also be used in combination with compounds which act only as the reaction medium. For example, nitrobenzene is a good reaction medium, and may be used in combination with one of the aforementioned bases. Other inert solvents which do not interfere with the catalyst or are not oxidized to any appreciable extent may also be used as the reaction medium. It was found, in the course of this work, that reaction media in which the products of the reaction are relatively insoluble lead to a cleaner, simpler separation of product from catalyst and by-products, thus increasing the yield of symmetrical azo diamine obtained.

In a preferred mode of operation of the process, molecular oxygen is used as the primary oxidant and may be introduced into the reaction medium by diffusion or injection. Either 100 percent oxygen or gas mixtures containing oxygen may be used. In addition, other compounds capable of supplying oxygen, such as hydrogen peroxide may be used.

The order of addition of the various reactants is not critical. In one preferred mode of carrying out this invention, the catalyst may be prepared by oxidizing cuprous chloride in a base such as pyridine. The symmetrical primary aromatic diamine is then added and oxidatively coupled by the addition of oxygen until about the theoretical volume has been consumed.

Alternatively, the catalyst may be prepared in the same manner as described above and then added to a chilled solution of the primary aromatic diamine in the appropriate reaction medium, prior to the addition of oxygen. In either case, the amount of oxygen consumed can be measured with great accuracy, by using a closed system and a gas buret.

The preparation of the catalyst and the oxidative coupling reaction may be carried out in the temperature range of from about −30° C. to about 120° C., preferably from about −20° to about 70° C. It has been found that the catalyst preparation may be carried out conveniently and preferably at room temperature. The rate of reaction is satisfactory at these temperatures and a very efficient catalyst is produced.

The surprising feature of the oxidative coupling reaction is that the dimer product obtained is essentially the only product resulting from the process.

Determination of the basicities of the amino groups of the starting diamine and the product can be helpful in predicting suitable conditions for carrying out the reaction. In general, as the difference in basicity between the preferentially oxidiazable amine groups of the starting material and of those of the product increases, the range of reaction conditions which can be used satisfactorily in the practice of this invention is broadened; conversely, as the difference in basicity becomes smaller, the range of conditions is narrowed.

The optimum reaction conditions to be used for carrying out the process will be dependent in large part on the structure and molecular weight of the starting material and final product. These conditions may be easily optimized by those skilled in the art.

The aromatic polyamides of this invention may be prepared by reacting asymmetrical aromatic azo diamine of the type above-described with an aromatic diacid halide having the structural formula

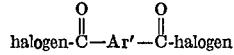

wherein Ar' is a divalent aromatic radical containing at least one aromatic ring exhibiting resonance in the classic sense, e.g. a ring characterized by the benzenoid unsaturation of benzene, naphthalene or a bridged diphenyl such as diphenyl ether or diphenyl sulfone. When Ar' is a single-ring radical, that ring may be carbocyclic or heterocyclic. When Ar' is a multi-ring radical, the rings in said radical may be all aromatic or inclusive of at least one ring that is not aromatic and they may be all carbocyclic, all heterocyclic or inclusive of carbocyclic and heterocyclic rings. The rings in such a multi-ring radical may be wholly or partially composed of fused-ring systems which may contain only carbocyclic rings, only heterocyclic rings or carbocyclic and heterocyclic rings or they may be wholly or partially composed of at least two carbocyclic and/or heterocyclic rings linked by a bond between a ring-atom of each of said rings or by a divalent radical as —O—,—S—,

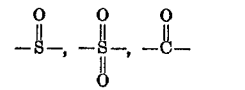

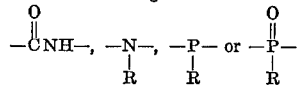

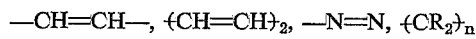

—CH=CH—, ⫶CH=CH⫶₂, —N=N, ⫶CR₂⫶ₙ wherein R is lower (e.g. $C_1-C_4$) alkyl radical and $n$ is an integer from 1 to 6. The aforementioned heterocyclic rings may contain one or more heteroatoms such as

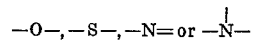

and are exemplified by pyridine, oxadiazole, thiazole, imidazole and pyrimidine rings.

The polyamides of this invention are generally but not exclusively prepared using diacid halides of such a type that the amide groups formed by polymerization of such diacid halides and the aforementioned azo diamines are directly linked to ring atoms of the diacid halides. The diacid halides employed are also generally such that the molecular weight of the

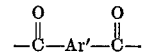

radical in the foregoing structural formula of the polyamide is not greater than about 700, although diacid halides having molecular weights of up to about 1000 may be employed in some cases. In the diacid halides employed, the divalent aromatic radical Ar' typically contains from one to five carbocyclic or heterocyclic rings although diacid halides containing a larger number of such rings can be used if desired. The rings in such Ar' radicals are also generally integral parts of the chain linking the two acid halide groups of the diacid halide rather than pendant from said chain. Examples of such aromatic diacid halides, in which the Ar' radical is symmetrical in most instances but may be alternatively asymmetrical, include isophthaloyl chloride, terephthaloyl chloride, bibenzoyl chloride and 2,6-naphthalene dicarbonyl chloride.

Examples of the polyamides of this invention have the following structural formulae:

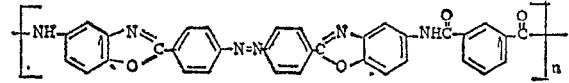

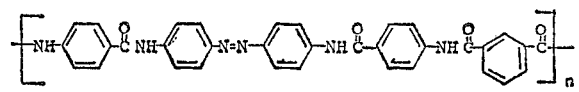

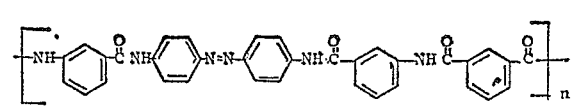

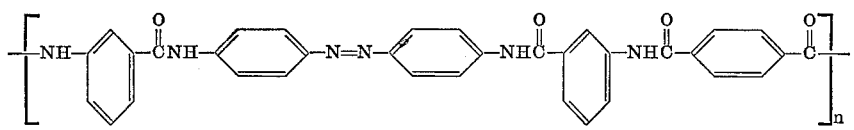

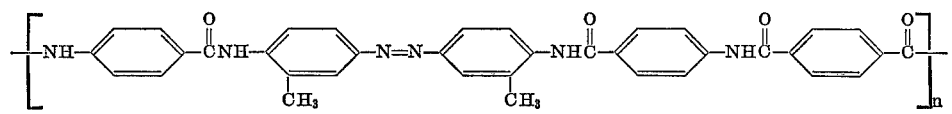

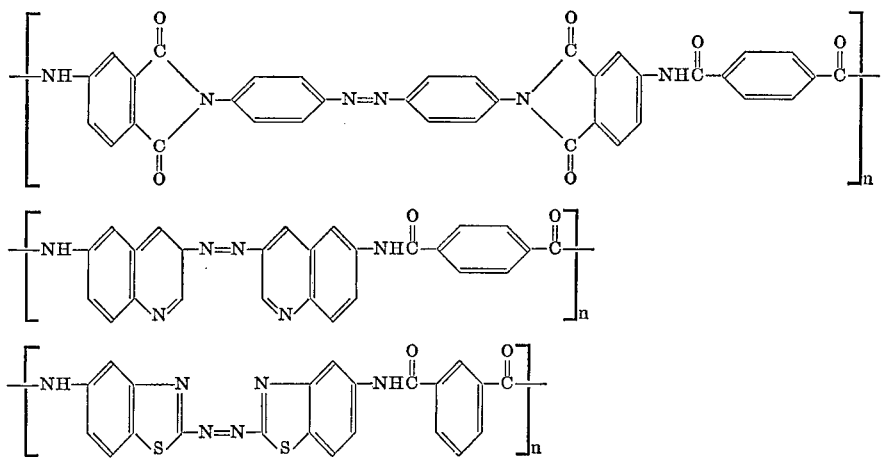

The polymers of this invention may be prepared using well known solution or interfacial reaction techniques. The solution method is usually preferred, since the polymer can be spun directly to fibers from the polymerization solution without filtering, washing or drying.

The solution method generally involves dissolving or slurrying the symmetrical aromatic azo diamine monomer in a suitable solvent for the polymer, which is inert to the polymerization reaction. Among such solvents there may be mentioned dimethylacetamide, N-methyl-2-pyrolidone, hexamethylphosphoramide (HPT) and the like or mixtures of the above. These solvents are rendered more effective in many instances by mixing them with a small amount, up to 10 percent, of an alkali or alkaline earth metal salt such as lithium chloride, magnesium bromide, calcium chloride and the like. The preferred solvent for the polymerization reaction is dimethylacetamide or dimethylacetamide containing a small amount of dissolved salts.

In the preparation of polymers, the diamine monomer solution is cooled to between 20 and −30° C. and the diacid halide is added, either as a solid or in a solution of one of the aforementioned solvents. The mixture is stirred until polymerization is substantially complete and a high molecular weight is attained. The viscous polymer solution may be spun per se or the polymer may be isolated by pouring the mixture into a non-solvent, washing and drying the polymer and then preparing the spinning solution.

For best results, the hydrogen halide, formed as a by-product of the polymerization reaction, should be neutralized or removed to prevent its harmful effects to the resulting articles. Neutralization may be conveniently accomplished by adding a proton acceptor such as an alkali or alkaline earth metal base, to form a salt and water. Suitable proton acceptors include sodium carbonate, calcium carbonate, lithium hydroxide and the like. As a result of the neutralization reaction, the polymers may be further dissolved in the solvent, containing an amount of salt and water proportional to the amount of hydrogen halide present. Although not absolutely essential, the addition of a small amount of water generally improves the stability of these polymer solutions.

The proportions of the various reactants which are employed in the polymerization reaction vary according to the type of polymer desired. In most instances, substantially equimolecular proportions or a slight excess of diamine to diacid halide are preferred. The number ($n$) of the recurring units in the foregoing structural formulae of the polyamides of this invention represents the number sufficient to provide the average molecular weight needed for film- or fiber-forming properties which are generally coincident with an inherent viscosity $$\left(\frac{\log_e \eta_r}{C}\right)$$

of at least about 0.4 as measured using a solution of 0.2 gram of the polyamide in 100 milliliters of a suitable solvent, e.g. concentrated sulfuric acid or an amide solvent such as dimethyl acetamide.

The interfacial polymerization reaction is conducted by mixing water, an emulsifier and the diamine which may be in the form of its dihydrochloride. A proton acceptor, such as sodium carbonate is then added and the mixture stirred rapidly. During this rapid stirring, a solution of the dicarbonyl monomer in an inert organic solvent such as chloroform, methylene chloride, or tetrahydrofuran is added, and the mixture stirred until the polymerization reaction is complete. The polymer is then isolated by filtration, followed by washing and drying. Suitable emulsifying agents for interfacial polymerization include anionic and nonionic compounds such as sodium lauryl sulfate and the like.

In many instances, the aromatic divalent radicals (Ar and Ar′) of the polyamides of this invention have no substituents that are pendent from the rings in said radicals. However, many other examples of those polyamides have advantageous properties (e.g. greater solubility in conveniently-used solvents) attributable to the presence of such ring-pendant substituents. To minimize crosslinkages, the polyamides are generally prepared by reaction of diamines and diacid halides having no such ring-pendant substituents that are reactive with amino or acid halide groups (particularly under the aforedescribed polymerization conditions) and, accordingly, the divalent aromatic radicals of the polyamides of this invention have no ring-pendant substituents of that type. Nitro groups, halo (e.g. chloro) groups, $C_1$–$C_4$ alkyl (e.g. methyl) groups and $C_1$–$C_4$ alkoxy (e.g. methoxy) groups are examples of substituents that are not reactive with amino or acid halide groups and which may therefore be pendant from the rings of the aforementioned divalent aromatic radicals (Ar and/or Ar′) in any numbers consistent with the foregoing generic descriptions of the diamines and diacid halides containing such radicals.

The polyamides of this invention are highly resistant to degradation by high temperatures or U.V. light and are therefore useful in a wide range of textile and industrial applications. Shaped article (e.g. fibers and film) of such polyamides are also characterized by excellent tensile strength.

EXAMPLE I

Preparation of monomer

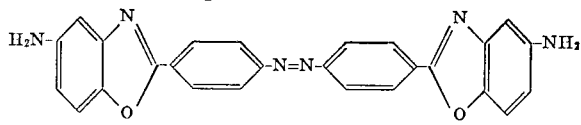

Cuprous chloride (0.1 g.) was oxidized with oxygen in a mixture of 20 ml. of DMAc and 5 ml. of pyridine. Then, 0.68 g. (0.003 mole) of 2-(p-aminophenyl)-5- aminobenzoxazole was added. The reaction mixture absorbed 36.5 ml. of oxygen (theory: 36.5 ml. of $O_2$ at 25° C.) in 140 min. at 25° C. The product was isolated by coagulation in aqueous ammonia. A yellow diamine (0.63 g.) was obtained. M.P.—342–345° C.

Analysis.—$C_{26}H_{18}N_6O_2$: Theory: N, 18.8%. Found: N, 18.6%.

Polymer preparation

Isophthaloyl chloride (0.148 g., 0.00073 mole) was added to a slurry of 0.325 g. (0.00073 mole) of 4,4'-bis-(5-amino-benzoxazolyl-2) azobenzene in 3 ml. of dimethylacetamide (DMAc)/5% LiCl at 0° C. On completion of the addition, the reaction mixture was stirred at 0° C. for 5 min., and then at room temperature for 28 hours. A total of 4 ml. of DMAc/5% LiCl was added to the reaction mixture in increments of 1 ml. and 2 ml. during the polymerization. The polymer solution was very

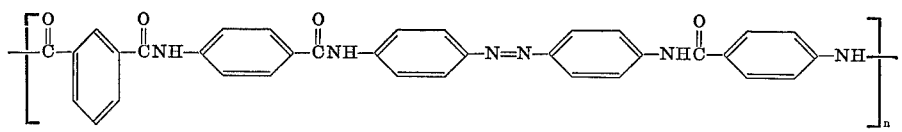

viscous at this point. The reaction mixture was coagulated by pouring into water with stirring to yield a yellow precipitate. After washing and drying the polymer represented by the following formula had an inherent viscosity of 1.72 (solution of 0.1 g. of polymer in 20 ml. of conc. $H_2SO_4$ at 30° C.).

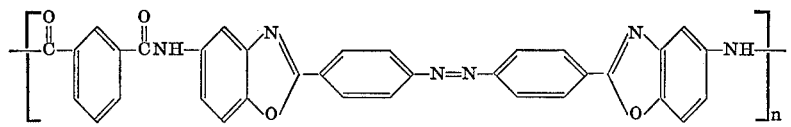

EXAMPLE II

Preparation of monomer

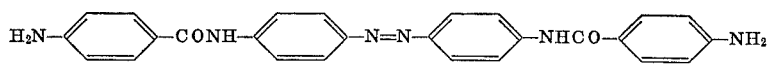

Cuprous chloride (1.6 g.) was oxidized with oxygen in a mixture of 80 ml. of dimethylacetamide (DMAc) and 20 ml. of pyridine. Then, 9.1 g. (0.04 mole) of 4,4'-diaminobenzanilide was added. The stirred reaction mixture absorbed 509 ml. of oxygen in 70 min. at 27–29° C. with 489 ml. of oxygen being absorbed in the first 16 min. (theory for dimerization: 489 ml. of $O_2$ at 25° C.) at which time the reaction essentially stopped. The product was isolated by precipitation of the reaction mixture with aqueous ammonia. Yield: 9.0 g. (99%) of yellow material. By reprecipitation from dimethylformamide with water a yellow diamine was obtained; M.P.—342–344° C.

Analysis.—$C_{26}H_{22}N_6O_2$: Theory (percent): C, 69.3; H, 4.98; N, 18.7. Found (percent): C, 68.6; H, 4.92; N, 18.7.

Polymer preparation

Isophthaloyl chloride (0.508 g., 0.0025 mole) was added to a slurry of 1.125 g. (0.0025 mole) of N,N'-bis-(4-aminobenzoyl)-4,4'-diaminoazobenzene in 13 ml. of DMAc/5% LiCl at 0° C., with stirring. After completion of the addition, the reaction was continued for 30 min. at 0° C., and then at room temperature for several hours. The viscosity of the reaction mixture increased markedly during the polymerization. The dope was neutralized with 0.12 g. (0.005 mole) of LiOH. A strong, yellow film was cast from the neutralized dope. The remaining dope was coagulated in water to yield a yellow polymer represented by recurring units of the following formula and having an inherent viscosity of 1.33 (solution of 0.1 g. of polymer in 20 ml. of DMAc/5% LiCl at 30° C.).

EXAMPLE III

Preparation of monomer

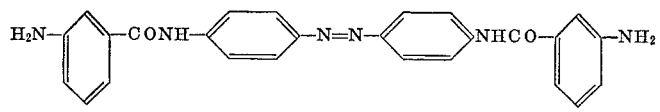

Cuprous chloride (1.0 g.) was oxidized with oxygen in a mixture of 120 ml. of DMAc and 30 ml. of pyridine. Then, 13.62 g. (0.06 mole) of 3,4'-diaminobenzanilide was added. The reaction mixture absorbed 761 ml. of oxygen in 250 min. at 0° C.; at this point oxygen absorption had essentially ceased. The precipitated product was isolated by filtration. Yield: 10.0 g. (78%) of yellow material, by recrystallization from DMAc a yellow diamine was obtained; M.P.—316–318° C.

Analysis.—$C_{26}H_{22}N_6O_2$: Theory (percent): C, 69.3; H, 4.89; N, 18.7. Found (percent): C, 68.5; H, 5.08; N, 18.3.

Polymer preparation

Terephthaloyl chloride (0.508 g., 0.0025 mole) was added at 0°2C. to a solution of 1.125 g. (0.0025 mole) of N,N'-bis(3-amino-benzoyl)-4,4'-diaminoazobenzene in 8.25 ml. of DMAc/5% LiCl. The reaction mixture was stirred 15 min. at 0° C. and then 25 hours at room temperature. During the polymerization the dope became very viscous. From the neutralized dope, a 0.75 mil film was cast and drawn at 325° C. The film remained flexible and strong for 8 days during exposure to air at 300° C. The coagulated polymer represented by units of the following formula had an inherent viscosity (30° C., 0.1 g. of polymer in 20 ml. of DMAc/LiCl) of 1.72.

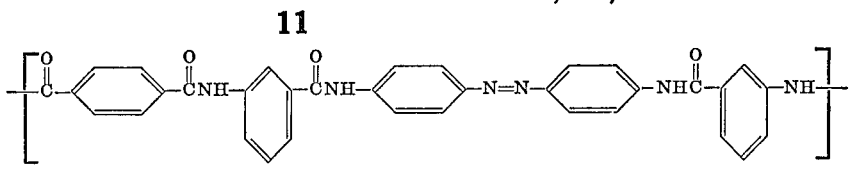

EXAMPLE IV

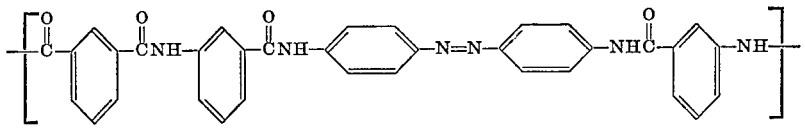

Isophthaloyl chloride (0.508 g., 0.0025 mole) was added at 0° C. to a solution of 1.125 g. (0.0025 mole) of N,N'-bis(3-aminobenzoyl)-4,4'-diaminoazobenzene in 8.9 ml. of DMAc/5% LiCl. After stirring for 15 min. at 0° C., the viscous dope was diluted with 2 ml. of DMAc/5% LiCl and the polymerization was continued at 25° C. for 18 hours. A drawn (at 315° C.) strip of this film remained flexible for 18 days upon exposure to 300° C. in air. The polymer had an inherent viscosity (30° C., 0.1 g. of polymer in 20 ml. of DMAc/5% LiCl) of 1.87.

EXAMPLE V

Preparation of monomer

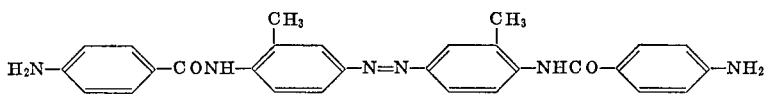

Cuprous chloride (1.0 g.) was oxidized with oxygen in a mixture of 80 ml. of DMAc and 20 ml. of pyridine. Then, 9.08 g. (0.038 mole) of 4,4'-diamino-2'-methylbenzanilide were added. In 3 hours the reaction mixture absorbed 445 ml. of $O_2$ (theory: 460 ml. of $O_2$ at 25° C.) at 25° C. The precipitated product was isolated by filtration. A yellow diamine (8.4 g.) was obtained, M.P. 322–323° C.

*Analysis.*—$C_{28}H_{26}N_6O_2$: Theory (percent): C, 70.3; H, 5.44; N, 17.6. Found (percent): C, 70.0; H, 5.86; N, 17.6.

Polymer preparation

Terephthaloyl chloride (0.508 g., 0.0025 mole) was added at 0° C. to a solution of 1.25 g. (0.0025 mole) of N,N'-bis(4-aminobenzoyl)-4,4'-diamino - 3,3' - dimethylazobenzene in 15.2 ml. of DMAc/5% LiCl. The reaction mixture was stirred 5 minutes at 0° C., 2 hours at room temperature, then neutralized with 0.12 g. LiOH and coagulated in water. An orange-brown polymer represented by the following formula was obtained; inherent viscosity (30° C., solution of 0.1 g. of polymer in 20 ml. of DMAc/ 5% LiCl): 1.53. A film of this polymer stayed flexible upon exposure to air at 310° C. for 8 days.

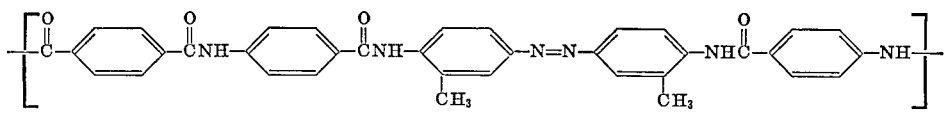

A 3.5 wt. percent solution of the polymer in DMAc/5% LiCl was dry jet wet spun into an aqueous coagulation bath. The coagulated filament was continuously removed from the bath at a rate to provide a jet stretch of 0.65×. From the coagulation bath the filament was washed in a cascade bath and simultaneously stretched 1.2× and then dried before winding on bobbins to provide an "as-spun" fiber. "Hot drawn" fibers were similarly prepared in a process where after the cascade and drying stages the filaments were hot drawn 1.16× at 300° C. and 1.07× at 400° C. over a hot shoe and thereafter wound onto bobbins. The fibers obtained had the following properties:

| | Tenacity (g./den.) | Elongation (percent) | Modulus (g./den.) |
|---|---|---|---|
| As-spun | 6.5 | 18.6 | 197 |
| Hot drawn: | | | |
| (I) | 9.7 | 2.36 | 587 |
| (II) | 9.4 | 1.4 | 821 |

EXAMPLE VI

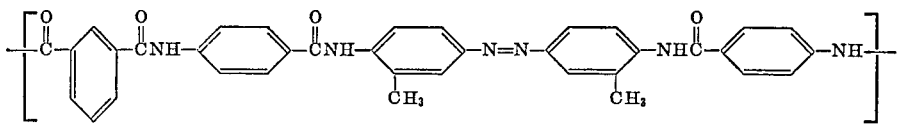

Isophthaloyl chloride (0.508 g., 0.0025 mole) was added at 0° C. to a solution of 1.125 g. (0.0025 mole) of N,N'-(4 - aminobenzoyl)-4,4'-diamino-3,3'-dimethylazobenzene in 8.9 ml. of DMAc/5% LiCl. The reaction mixture was stirred at 0° C., 5 hours at room temperature, neutralized with 0.12 g. of LiOH and coagulated in $H_2O$. A yellow polymer was obtained; inherent viscosity (30° C., solution of 0.1 g. of polymer in 20 ml. of DMAc/5% LiCl): 1.04. A strong film of the polymer could be drawn over a hot-pin at 340° C.

I claim:

1. A linear film- or fiber-forming aromatic polyamide consisting essentially of recurring units having the structural formula

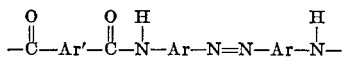

wherein Ar represents an asymmetrical divalent aromatic radical, Ar' represents a divalent aromatic radical and

has a molecular weight not greater than about 1000, said radicals having no substituents that are reactive with amino groups or acid halide groups.

2. The polyamide of claim 1 wherein

is symmetrical.

3. The polyamide of claim 2 wherein Ar is a single-ring divalent aromatic radical.

4. The polyamide of claim 2 wherein Ar is a multi-ring divalent aromatic radical.

5. The polyamide of claim 4 wherein Ar contains at least two rings linked by a bond between a ring-atom of each of said rings or a divalent radical selected from the group consisting of —O—, —S—,

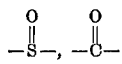

—CH=CH—, —(CH=CH)₂—, —N=N—,

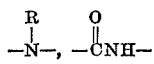

—(CR₂)ₙ—,

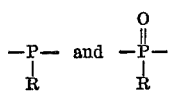

where R is $C_1$–$C_4$ alkyl and $n$ is an integer from 1 to 6.

6. The polyamide of claim 2 wherein Ar is a fused-ring divalent aromatic radical.

7. The polyamide of claim 2 wherein Ar' is meta-phenylene or para-phenylene.

8. The polyamide of claim 2 wherein the amide groups are directly linked to ring atoms in said radicals.

9. The polyamide of claim 2 wherein said radicals have no substituents other than nitro, halo, $C_1$–$C_4$ alkyl or $C_1$–$C_4$ alkoxy radicals.

10. The polyamide of claim 2 wherein the recurring units have the structural formula

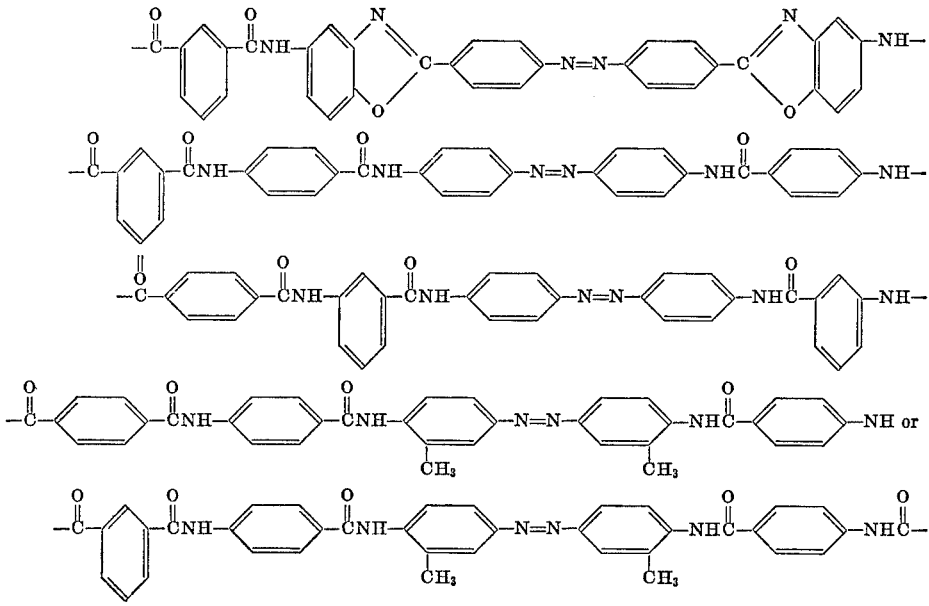

11. A self-supporting film of the polyamide of claim 2.
12. A self-supporting fiber of the polyamide of claim 2.

References Cited
UNITED STATES PATENTS 3,501,444   3/1970   Bach _____ 260—78
2,994,693   8/1961   Blake et al. _____ 260—144

WILLIAM H. SHORT, Primary Examiner
L. L. LEE, Assistant Examiner

U.S. Cl. X.R.
260—32.6 N, 47 CZ, 65